(12) United States Patent
Ludwig et al.

(10) Patent No.: US 7,940,340 B2
(45) Date of Patent: May 10, 2011

(54) MULTILAYER BODY WITH ELECTRICALLY CONTROLLABLE OPTICALLY ACTIVE SYSTEMS OF LAYERS

(75) Inventors: Klaus Ludwig, Erlangen (DE); Wolfgang Clemens, Puschendorf (DE)

(73) Assignees: PolyIC GmbH & Co. KG, Fuerth (DE); Leonhard Kurz Stiftung & Co. KG, Fuerth (DE)

( * ) Notice: Subject to any disclaimer, the term of this patent is extended or adjusted under 35 U.S.C. 154(b) by 391 days.

(21) Appl. No.: 11/994,571

(22) PCT Filed: Jul. 4, 2006

(86) PCT No.: PCT/EP2006/006472
§ 371 (c)(1),
(2), (4) Date: Feb. 14, 2008

(87) PCT Pub. No.: WO2007/003405
PCT Pub. Date: Jan. 11, 2007

(65) Prior Publication Data
US 2008/0198278 A1  Aug. 21, 2008

(30) Foreign Application Priority Data

Jul. 4, 2005 (DE) .......................... 10 2005 031 448

(51) Int. Cl.
*G02F 1/13* (2006.01)
*G02F 1/03* (2006.01)
*G02B 5/18* (2006.01)

(52) U.S. Cl. ............. 349/1; 349/201; 359/245; 359/558

(58) Field of Classification Search ........................ None
See application file for complete search history.

(56) References Cited

U.S. PATENT DOCUMENTS

| | | |
|---|---|---|
| 3,512,052 A | 5/1970 | MacIver et al. |
| 3,769,096 A | 10/1973 | Ashkin |
| 3,955,098 A | 5/1976 | Kawamoto |
| 3,999,122 A | 12/1976 | Winstel et al. |
| 4,246,298 A | 1/1981 | Guarnery |
| 4,302,648 A | 11/1981 | Sado et al. |
| 4,340,057 A | 7/1982 | Bloch |
| 4,442,019 A | 4/1984 | Marks |
| 4,472,627 A | 9/1984 | Weinberger |
| 4,554,229 A | 11/1985 | Small |
| 4,865,197 A | 9/1989 | Craig |

(Continued)

FOREIGN PATENT DOCUMENTS

AU  488652  4/1976

(Continued)

OTHER PUBLICATIONS

Angelopoulos M et al., "In-Situ Radiation Induced Doping", Mol. Crystl. Liq. Cryst., 1990, vol. 189, pp. 221-225.

(Continued)

*Primary Examiner* — Omar Rojas
(74) *Attorney, Agent, or Firm* — Carella, Byrne et al.; Elliot M. Olstein; William Squire

(57) ABSTRACT

A multilayer body (1) having an optically active first layer system (10) is described, in which case the first layer system (10) is an optically variable device (OVD), and the optical effect of the first layer system (10) can be influenced by an electrically controllable second layer system (20).

21 Claims, 6 Drawing Sheets

U.S. PATENT DOCUMENTS

| | | | |
|---|---|---|---|
| 4,926,052 A | 5/1990 | Hatayama | |
| 4,937,119 A | 6/1990 | Nickles et al. | |
| 5,053,679 A | 10/1991 | Thioulouse | |
| 5,075,816 A | 12/1991 | Stormbom | |
| 5,173,835 A | 12/1992 | Cornett et al. | |
| 5,202,677 A | 4/1993 | Parker et al. | |
| 5,206,525 A | 4/1993 | Yamamoto et al. | |
| 5,259,926 A | 11/1993 | Kuwabara et al. | |
| 5,321,240 A | 6/1994 | Takihira | |
| 5,347,144 A | 9/1994 | Garnier et al. | |
| 5,364,735 A | 11/1994 | Akamatsu | |
| 5,395,504 A | 3/1995 | Hoffman et al. | |
| 5,480,839 A | 1/1996 | Ezawa et al. | |
| 5,486,851 A | 1/1996 | Gehner et al. | |
| 5,502,396 A | 3/1996 | Desarzens | |
| 5,528,222 A | 6/1996 | Moskowitz | |
| 5,546,889 A | 8/1996 | Wakita et al. | |
| 5,569,879 A | 10/1996 | Gloton | |
| 5,574,291 A | 11/1996 | Dodabalapur et al. | |
| 5,578,513 A | 11/1996 | Maegawa | |
| 5,580,794 A | 12/1996 | Allen | |
| 5,625,199 A | 4/1997 | Baumbach et al. | |
| 5,625,474 A | 4/1997 | Aomori et al. | |
| 5,629,530 A | 5/1997 | Brown et al. | |
| 5,630,986 A | 5/1997 | Charlton | |
| 5,652,645 A | 7/1997 | Jain | |
| 5,691,089 A | 11/1997 | Smayling | |
| 5,693,956 A | 12/1997 | Shi | |
| 5,705,826 A | 1/1998 | Aratani et al. | |
| 5,707,894 A | 1/1998 | Hsiao | |
| 5,729,428 A | 3/1998 | Sakata et al. | |
| 5,854,139 A | 12/1998 | Kondo et al. | |
| 5,869,972 A | 2/1999 | Birch et al. | |
| 5,883,397 A | 3/1999 | Isoda et al. | |
| 5,892,244 A | 4/1999 | Tanaka et al. | |
| 5,946,551 A | 8/1999 | Dimitrakopoulos | |
| 5,967,048 A | 10/1999 | Fromson et al. | |
| 5,970,318 A | 10/1999 | Choi et al. | |
| 5,973,598 A | 10/1999 | Beigel | |
| 5,994,773 A | 11/1999 | Hirakawa | |
| 5,997,817 A | 12/1999 | Crismore et al. | |
| 5,998,805 A | 12/1999 | Shi et al. | |
| 6,036,919 A | 3/2000 | Thym et al. | |
| 6,045,977 A | 4/2000 | Chandross et al. | |
| 6,060,338 A | 5/2000 | Tanaka et al. | |
| 6,072,716 A | 6/2000 | Jacobsen et al. | |
| 6,083,104 A | 7/2000 | Choi | |
| 6,087,196 A | 7/2000 | Sturm et al. | |
| 6,107,920 A | 8/2000 | Eberhardt et al. | |
| 6,133,835 A | 10/2000 | DeLeeuw et al. | |
| 6,150,668 A | 11/2000 | Bao | |
| 6,180,956 B1 | 1/2001 | Chondroudis | |
| 6,197,663 B1 | 3/2001 | Chandross | |
| 6,207,472 B1 | 3/2001 | Callegari et al. | |
| 6,215,130 B1 | 4/2001 | Dodabalapur | |
| 6,221,553 B1 | 4/2001 | Wolk | |
| 6,251,513 B1 | 6/2001 | Rector | |
| 6,259,506 B1 | 7/2001 | Lawandy | |
| 6,281,952 B1 * | 8/2001 | Okamoto et al. | 349/12 |
| 6,284,562 B1 | 9/2001 | Batlogg et al. | |
| 6,291,126 B2 | 9/2001 | Wolk et al. | |
| 6,300,141 B1 | 10/2001 | Segal et al. | |
| 6,321,571 B1 | 11/2001 | Themont et al. | |
| 6,322,736 B1 | 11/2001 | Bao | |
| 6,326,288 B1 | 12/2001 | Bornefeld | |
| 6,329,226 B1 | 12/2001 | Jones | |
| 6,330,464 B1 | 12/2001 | Colvin | |
| 6,335,539 B1 | 1/2002 | Dimitrakopoulos et al. | |
| 6,336,017 B1 | 1/2002 | Miyamoto et al. | |
| 6,340,822 B1 | 1/2002 | Brown et al. | |
| 6,344,662 B1 | 2/2002 | Dimitrakopoulos et al. | |
| 6,362,509 B1 | 3/2002 | Hart | |
| 6,369,793 B1 | 4/2002 | Parker | |
| 6,384,804 B1 | 5/2002 | Dodabalapur et al. | |
| 6,403,396 B1 | 6/2002 | Gudesen et al. | |
| 6,414,728 B1 | 7/2002 | Faris et al. | |
| 6,429,450 B1 | 8/2002 | Mutsaers et al. | |
| 6,483,473 B1 | 11/2002 | King et al. | |
| 6,498,114 B1 | 12/2002 | Amundson et al. | |
| 6,517,995 B1 | 2/2003 | Jacobson et al. | |
| 6,518,949 B2 | 2/2003 | Drzaic | |
| 6,521,109 B1 | 2/2003 | Bartic et al. | |
| 6,528,816 B1 | 3/2003 | Jackson et al. | |
| 6,541,130 B2 | 4/2003 | Fukuda | |
| 6,548,875 B2 | 4/2003 | Nishiyama | |
| 6,555,840 B1 | 4/2003 | Hudson | |
| 6,566,156 B1 | 5/2003 | Sturm et al. | |
| 6,593,690 B1 | 7/2003 | McCormick | |
| 6,596,569 B1 | 7/2003 | Bao et al. | |
| 6,603,139 B1 | 8/2003 | Tessler | |
| 6,621,098 B1 | 9/2003 | Jackson | |
| 6,686,693 B1 | 2/2004 | Ogawa | |
| 6,699,728 B2 | 3/2004 | Guenther et al. | |
| 6,736,985 B1 | 5/2004 | Bao et al. | |
| 6,753,994 B1 * | 6/2004 | Russell | 359/254 |
| 6,852,583 B2 | 2/2005 | Bernds et al. | |
| 6,859,093 B1 | 2/2005 | Beigel | |
| 6,903,958 B2 | 6/2005 | Bernds et al. | |
| 6,960,489 B2 | 11/2005 | Bernds et al. | |
| 7,064,345 B2 | 6/2006 | Fix et al. | |
| 7,223,995 B2 | 5/2007 | Fix et al. | |
| 7,229,868 B2 | 6/2007 | Bernds et al. | |
| 7,238,961 B2 | 7/2007 | Bernds et al. | |
| 7,298,023 B2 | 11/2007 | Guillet | |
| 7,329,559 B2 | 2/2008 | Bernds et al. | |
| 7,414,513 B2 | 8/2008 | Fix | |
| 7,442,954 B2 | 10/2008 | Clemens | |
| 7,479,670 B2 | 1/2009 | Fix | |
| 7,483,275 B2 | 1/2009 | Clemens | |
| 7,534,034 B2 | 5/2009 | Clemens | |
| 7,576,294 B2 | 8/2009 | Clemens | |
| 7,589,553 B2 | 9/2009 | Ullmann | |
| 7,641,857 B2 | 1/2010 | Clemens | |
| 7,678,857 B2 | 3/2010 | Bernds | |
| 7,709,865 B2 | 5/2010 | Clemens | |
| 7,724,550 B2 | 5/2010 | Bohm | |
| 7,786,818 B2 | 8/2010 | Bohm | |
| 7,812,343 B2 | 10/2010 | Ullmann | |
| 2001/0006846 A1 | 7/2001 | Cao et al. | |
| 2001/0026187 A1 | 10/2001 | Oku | |
| 2001/0046081 A1 | 11/2001 | Hayashi et al. | |
| 2001/0048341 A1 | 12/2001 | Chakravarthy | |
| 2002/0018911 A1 | 2/2002 | Bernius et al. | |
| 2002/0022284 A1 | 2/2002 | Heeger | |
| 2002/0025391 A1 | 2/2002 | Angelopoulos | |
| 2002/0053320 A1 | 5/2002 | Duthaler | |
| 2002/0056839 A1 | 5/2002 | Joo et al. | |
| 2002/0068392 A1 | 6/2002 | Lee et al. | |
| 2002/0130042 A1 | 9/2002 | Moerman et al. | |
| 2002/0170897 A1 | 11/2002 | Hall | |
| 2002/0195644 A1 | 12/2002 | Dodabalapur et al. | |
| 2003/0059987 A1 | 3/2003 | Sirringhaus et al. | |
| 2003/0070500 A1 | 4/2003 | Hung | |
| 2003/0112576 A1 | 6/2003 | Brewer et al. | |
| 2003/0141807 A1 | 7/2003 | Kawase | |
| 2003/0178620 A1 | 9/2003 | Bernds et al. | |
| 2003/0227664 A1 | 12/2003 | Agrawal et al. | |
| 2004/0002176 A1 | 1/2004 | Xu | |
| 2004/0013982 A1 | 1/2004 | Jacobson et al. | |
| 2004/0026689 A1 | 2/2004 | Bernds et al. | |
| 2004/0029310 A1 | 2/2004 | Bernds et al. | |
| 2004/0063267 A1 | 4/2004 | Bernds et al. | |
| 2004/0084670 A1 | 5/2004 | Tripsas et al. | |
| 2004/0092196 A1 | 5/2004 | Van De Witte et al. | |
| 2004/0119504 A1 | 6/2004 | Baude et al. | |
| 2004/0160389 A1 | 8/2004 | Suyama et al. | |
| 2004/0211329 A1 | 10/2004 | Funahata et al. | |
| 2004/0233065 A1 | 11/2004 | Freeman | |
| 2004/0239586 A1 | 12/2004 | Cok | |
| 2004/0246413 A1 | 12/2004 | Stephenson et al. | |
| 2004/0256467 A1 | 12/2004 | Clemens et al. | |
| 2005/0062066 A1 | 3/2005 | Bao et al. | |
| 2005/0098775 A1 | 5/2005 | Kondo | |
| 2005/0127357 A1 | 6/2005 | Wong et al. | |
| 2005/0128403 A1 * | 6/2005 | Liu | 349/141 |

| | | | | | | |
|---|---|---|---|---|---|---|
| 2005/0168340 | A1 | 8/2005 | Mosher et al. | EP | 0 962 984 A3 | 12/1999 |
| 2005/0232530 | A1* | 10/2005 | Kekas ........................... 385/11 | EP | 0 964 516 B1 | 12/1999 |
| 2006/0262235 | A1* | 11/2006 | Vogels et al. ................. 349/10 | EP | 0 966 182 | 12/1999 |

FOREIGN PATENT DOCUMENTS

| | | |
|---|---|---|
| DE | 2102735 | 8/1972 |
| DE | 33 38 597 | 5/1985 |
| DE | 37 05 109 | 8/1987 |
| DE | 41 03 675 | 8/1992 |
| DE | 692 32 740 T2 | 4/1993 |
| DE | 42 43 832 | 6/1994 |
| DE | 43 12 766 | 10/1994 |
| DE | 196 29 291 | 1/1997 |
| DE | 196 48 937 | 5/1997 |
| DE | 196 10 284 | 8/1997 |
| DE | 195 06 907 | 9/1998 |
| DE | 198 52 312 | 5/1999 |
| DE | 198 16 860 | 11/1999 |
| DE | 199 18 193 | 11/1999 |
| DE | 198 51 703 | 5/2000 |
| DE | 100 06 257 | 9/2000 |
| DE | 199 21 024 | 11/2000 |
| DE | 199 33 757 | 1/2001 |
| DE | 695 19 782 | 1/2001 |
| DE | 199 35 527 | 2/2001 |
| DE | 199 37 262 | 3/2001 |
| DE | 100 12 204 | 9/2001 |
| DE | 100 33 112 | 1/2002 |
| DE | 201 11 825 | 2/2002 |
| DE | 100 43 204 | 4/2002 |
| DE | 100 45 192 | 4/2002 |
| DE | 100 47 171 | 4/2002 |
| DE | 100 58 559 | 5/2002 |
| DE | 100 61 297 | 6/2002 |
| DE | 101 17 663 | 10/2002 |
| DE | 101 20 687 | 10/2002 |
| DE | 101 20 686 | 11/2002 |
| DE | 101 26 859 | 12/2002 |
| DE | 101 26 860 | 12/2002 |
| DE | 101 51 440 | 2/2003 |
| DE | 101 41 440 | 3/2003 |
| DE | 101 53 656 | 5/2003 |
| DE | 101 63 267 | 7/2003 |
| DE | 102 09 400 | 10/2003 |
| DE | 102 12 640 | 10/2003 |
| DE | 102 19 905 | 12/2003 |
| DE | 102 29 168 | 1/2004 |
| DE | 103 41 962 | 4/2004 |
| DE | 699 13 745 | 10/2004 |
| DE | 103 30 064 | 12/2004 |
| DE | 103 30 063 | 2/2005 |
| DE | 103 35 336 | 3/2005 |
| DE | 103 38 277 | 3/2005 |
| DE | 103 40 641 | 4/2005 |
| EP | 0 108 650 | 5/1984 |
| EP | 0 128 529 | 12/1984 |
| EP | 0 268 370 A2 | 5/1988 |
| EP | 0 268 370 A3 | 5/1988 |
| EP | 0 350 179 | 1/1990 |
| EP | 0 418 504 | 3/1991 |
| EP | 0 435 029 | 7/1991 |
| EP | 0435 029 | 7/1991 |
| EP | 0 442 123 | 8/1991 |
| EP | 0 460 242 | 12/1991 |
| EP | 0 501 456 A2 | 9/1992 |
| EP | 0 501 456 A3 | 9/1992 |
| EP | 0 511 807 | 11/1992 |
| EP | 0 528 662 | 2/1993 |
| EP | 0 588 721 | 3/1994 |
| EP | 0 603 939 A2 | 6/1994 |
| EP | 0 615 256 | 9/1994 |
| EP | 0 685 985 | 12/1995 |
| EP | 0 716 458 A2 | 6/1996 |
| EP | 0 716 458 A3 | 6/1996 |
| EP | 0 785 578 A2 | 7/1997 |
| EP | 0 785 578 A3 | 7/1997 |
| EP | 0 786 820 | 7/1997 |
| EP | 0 690 457 | 12/1999 |
| EP | 0 962 984 A2 | 12/1999 |
| EP | 0 979 715 | 2/2000 |
| EP | 0 981 165 | 2/2000 |
| EP | 0 989 614 A2 | 3/2000 |
| EP | 1 048 912 | 11/2000 |
| EP | 1 052 594 | 11/2000 |
| EP | 1 065 725 A2 | 1/2001 |
| EP | 1 065 725 A3 | 1/2001 |
| EP | 1 083 775 | 3/2001 |
| EP | 1 102 335 A2 | 5/2001 |
| EP | 1 103 916 | 5/2001 |
| EP | 1 104 035 A2 | 5/2001 |
| EP | 1 113 502 | 7/2001 |
| EP | 1 134 694 | 9/2001 |
| EP | 1 170 851 | 1/2002 |
| EP | 1 215 725 | 6/2002 |
| EP | 1 224 999 | 7/2002 |
| EP | 1 237 207 | 9/2002 |
| EP | 1 251 720 | 10/2002 |
| EP | 1 296 280 | 3/2003 |
| EP | 1 318 084 | 6/2003 |
| EP | 1 383 179 | 1/2004 |
| EP | 1 401 245 | 3/2004 |
| EP | 1 434 281 | 6/2004 |
| FR | 2793089 | 11/2000 |
| GB | 723598 | 2/1955 |
| GB | 2 058 462 | 4/1981 |
| JP | 54069392 | 6/1979 |
| JP | 60117769 | 6/1985 |
| JP | 61001060 | 1/1986 |
| JP | 61167854 | 7/1986 |
| JP | 62065472 A | 3/1987 |
| JP | 362065477 A | 3/1987 |
| JP | 63205943 | 8/1988 |
| JP | 01169942 | 7/1989 |
| JP | 2969184 | 12/1991 |
| JP | 03290976 A | 12/1991 |
| JP | 05152560 | 6/1993 |
| JP | 05259434 | 10/1993 |
| JP | 05347422 | 12/1993 |
| JP | 06-196724 | 7/1994 |
| JP | 08197788 | 8/1995 |
| JP | 09083040 | 3/1997 |
| JP | 09320760 | 12/1997 |
| JP | 10026934 | 1/1998 |
| JP | 11-040708 | 2/1999 |
| JP | 2000-029403 | 1/2000 |
| JP | 2000-173770 | 6/2000 |
| JP | 2001-085272 | 3/2001 |
| JP | 2001-147659 | 5/2001 |
| JP | 2001-267578 | 9/2001 |
| WO | WO 93/16491 | 8/1993 |
| WO | WO 94/17556 | 8/1994 |
| WO | WO 95/06240 | 3/1995 |
| WO | WO 95/31831 | 11/1995 |
| WO | WO 96/02924 | 2/1996 |
| WO | WO 96/19792 | 6/1996 |
| WO | WO 97/12349 | 4/1997 |
| WO | WO 97/18944 | 5/1997 |
| WO | WO 98/18156 | 4/1998 |
| WO | WO 98/18186 | 4/1998 |
| WO | WO 98/40930 | 9/1998 |
| WO | WO 99/07189 | 2/1999 |
| WO | WO 99/10769 | 3/1999 |
| WO | WO 99/10929 | 3/1999 |
| WO | WO 99/10939 | 3/1999 |
| WO | WO 99/21233 | 4/1999 |
| WO | WO 99/30432 | 6/1999 |
| WO | WO 99/39373 | 8/1999 |
| WO | WO 99/40631 | 8/1999 |
| WO | WO 99/53371 | 10/1999 |
| WO | WO 99/54842 | 10/1999 |
| WO | WO 99/54936 | 10/1999 |
| WO | WO 99/66540 | 12/1999 |
| WO | WO 00/07151 | 2/2000 |
| WO | WO 00/33063 | 6/2000 |
| WO | WO 00/36666 | 6/2000 |

| | | |
|---|---|---|
| WO | WO 00/76778 | 12/2000 |
| WO | WO 00/79617 | 12/2000 |
| WO | WO 01/03126 | 1/2001 |
| WO | WO 01/06442 | 1/2001 |
| WO | WO 01/08241 | 2/2001 |
| WO | WO 01/15233 | 3/2001 |
| WO | WO 01/17029 | 3/2001 |
| WO | WO 01/17041 | 3/2001 |
| WO | WO 01/27998 | 4/2001 |
| WO | WO 01/35500 | 5/2001 |
| WO | WO 01/46987 | 6/2001 |
| WO | WO 01/47044 A2 | 6/2001 |
| WO | WO 01/47044 A3 | 6/2001 |
| WO | WO 01/47045 | 6/2001 |
| WO | WO 01/69517 | 9/2001 |
| WO | WO 01/73109 A2 | 10/2001 |
| WO | WO 01/73109 A3 | 10/2001 |
| WO | WO 02/05360 | 1/2002 |
| WO | WO 02/05361 | 1/2002 |
| WO | WO 02/15264 | 2/2002 |
| WO | WO 02/17233 | 2/2002 |
| WO | WO 02/19443 | 3/2002 |
| WO | WO 02/21612 | 3/2002 |
| WO | WO 02/29912 | 4/2002 |
| WO | WO 02/43071 | 5/2002 |
| WO | WO 02/47183 | 6/2002 |
| WO | WO 02/065557 A1 | 8/2002 |
| WO | WO 02/071139 | 9/2002 |
| WO | WO 02/071505 | 9/2002 |
| WO | WO 02/076924 | 10/2002 |
| WO | WO 02/091495 A2 | 11/2002 |
| WO | WO 02/091495 A3 | 11/2002 |
| WO | WO 02/095805 A2 | 11/2002 |
| WO | WO 02/095805 A3 | 11/2002 |
| WO | WO 02/099907 | 12/2002 |
| WO | WO 02/099908 | 12/2002 |
| WO | WO 03/027948 | 4/2003 |
| WO | WO 03/036686 | 5/2003 |
| WO | WO 03/038897 | 5/2003 |
| WO | WO 03/046922 | 6/2003 |
| WO | WO 03/057501 | 7/2003 |
| WO | WO 03/067680 | 8/2003 |
| WO | WO 03/069552 | 8/2003 |
| WO | WO 03/081671 | 10/2003 |
| WO | WO 03/095175 | 11/2003 |
| WO | WO 2004/032257 | 4/2004 |
| WO | WO 2004/042837 A2 | 5/2004 |
| WO | WO 2004/042837 A3 | 5/2004 |
| WO | WO 2004/047144 A2 | 6/2004 |
| WO | WO 2004/047144 A3 | 6/2004 |
| WO | WO 2004/047194 A2 | 6/2004 |
| WO | WO 2004/047194 A3 | 6/2004 |
| WO | WO 2004/063806 | 7/2004 |
| WO | WO 2004/068267 | 8/2004 |
| WO | WO 2004/068608 | 8/2004 |
| WO | WO 2004/083859 | 9/2004 |
| WO | WO 2004/111729 | 12/2004 |
| WO | WO 2005/004194 | 1/2005 |
| WO | WO 2005/022664 | 3/2005 |
| WO | WO 2005/027216 | 3/2005 |

OTHER PUBLICATIONS

Assadi A, et al:, Field-Effect Mobility of Poly (3-Hexylthiophene) Dept. of Physics and Measurement Technology, Received Mar. 3, 1988; accepted for Publication May 17, 1988.

Backlund, et al, "Towards all-polymer field-effect transistors with solution processable materials", Synthetic Metals, Elsevier Sequoia, Lausanne, CH, vol. 148, No. 1, Jan. 3, 2005, pp. 87-91.

Bao, Z. et al., "High-Performance Plastic Transistors Fabricatecd by Printing Techniques", Chem. Mater vol. 9, No. 6, 1997, pp. 1299-1301.

Bao, Z. et al. "Organic and Polymeric Materials for the Fabrications of Thin Film Field-Effect Transistors", paper presented at the meeting of American Chemical Society, Division of Polymer Chemistry, XX, XX, vol. 39, No. 1, Mar. 29, 1998.

Baude P F et al, "Organic semiconductor RFID transponders" International Electron Devices Meeting 2003. IEDM. Technical Digest. Washington, DC, Dec. 8-10, 2003, New York NY, IEEE, US Dec. 8, 2003, pp. 191-194.

Belloni, F. et al, "Parameters Optimization for Improved Dynamics of Voltage Multipliers for Space", 2004 $35^{th}$ Annual IEEE Electronics Specialists Conference, Aachen, Germany, 2004, pp. 439-442.

Brabec, C.J. et al, "Photoinduced FT-IR spectroscopy and CW-photocurrent measurements of conjugated polymers and fullerenes blended into a conventional polymer matrix", Solar Energy Materials and Solar Cells, 2000 Elsevier Science V.V., pp. 19-33.

Brabec, C.J. et al., "Photovoltaic properties of a conjugated polymer/methanofullerene composites embedded in a polystyrene matrix", Journal of Applied Physics, vol. 85, No. 9, 1999, pp. 6866-6872.

Braun D., et al, "Visible light emission from semiconducting polymer diodes", American Institute of Physics, Applied Physics Letters 58, May 6, 1991, pp. 1982-1984.

Brown, A.R. et al., "Field-effect transistors made from solution-processed organic semiconductors", Elsevier Science, S.A., Synthetic Metals 88 (1997) pp. 37-55.

Brown, A.R., "Logic Gates Made from Polymer Transistors and Their Use in Ring Oscillators", Science, vol. 270, Nov. 10, 1995, pp. 972-974.

Chen, Shiao-Shien et al:, "Deep Submicrometer Double-Gate Fully-Depleted SOI PMOS Devices: A Concise Short-Channel Effect Threshold Voltage Model Using a Quasi-2D Approadh", IEEE Transaction on Electron Devices, vol. 43, No. 9, Sep. 1996.

Chen, X.L. et al., "Morphological and Transistor Studies of Organic Molecular Semiconductors with Anisotropic Electrical Characteristics", American Chemical Society, 2001, Chem. Mater. 2001, 13, 1341-1348.

Clemens, W. et al., "Vom Organischen Transistor Zum Plastik-Chip," Physik Journal, V. 2, 2003, pp. 31-36.

Collet J. et al:, Low Voltage, 30 NM Channel Length, Organic Transistors With a Self-Assembled Monolayer As Gate Insulating Films:, Applied Physics Letters, American Institute of Physics. New York, US, Bd 76, Nr. 14, Apr. 3, 2000, Seiten 1941-1943, XP000950589, ISSN:0003-6951, das ganze Dokument.

Cox, Robert W. et al., "A Minimally Intrusive, Low Cost System for Determining Indoor Air Flow Patterns", Computers in Power Electronics, 2004. IEEE Workshop on Urbana, IL Aug. 15-18, 2004, Piscataway, NJ, IEEE, Aug. 15, 2004, pp. 63-68.

Crone, B. et al, "Large-scale complementary Integrated circuits based on Organic transistors", Nature, vol. 403, Feb. 3, 2000, pp. 521.

Crone B. K. et al., "Design and Fabrication of Organic Complementary Circuits", J. Appl. Phys. vol. 89, May 2001, pp. 5125-5132.

Dai, L. et al, Photochemical Generation of Conducting Pattersn in Polybutadiene Films:, Macromolecules, vol. 29, No. 1, 1996, pp. 282-287, XP 001042019, the whole document.

Dai, L. et al., "Conjugation of Polydienes by Oxidants Other Than Iodine", Elsevier Science S.A., Synthetic Metals 86 (1997) 1893-1894.

Dai, L. et al., "$I_2$-Doping" of 1,4-Polydienes, Elsevier Science S.A., Synthetic Metals 69 (1995), pp. 563-566.

De Leeuw C.M. et al., "Polymeric integrated circuits and light-emitting diodes", Electron Devices Meeting, 1997. Technical Digest, International, Washington, DC, USA Dec. 7-10, 1997, New York, NY, USA, IEEE, US Dec. 7, 1997.

Dodabalapur, A. et al., Organic smart pixels, American Institute of Physics, Applied Physics Letters, vol. 73, No. 2, Jul. 13, 1998, pp. 142-144.

Drury et al., "Low-Cost All-Polymer Integrated Circuits", American Institute of Physics, Applied Physics Letters, 1998, vol. 73, No. 1, pp. 108-110, Jul. 6, 1998.

Ficker, J. et al., "Dynamic and Lifetime Measurements of Polymer OFETS and Integrated Plastic Circuits, " Proc. of SPIE, v. 466, 2001, pp. 95-102.

Fix, W. et al., "Fast Polymer Integrated Circuits Based on a Polyfluorene Derivative", ESSDERC 2002, 2002, pp. 527-529.

Fix, W., et al., "Fast polymer integrated circuits", American Institute of Physics, Applied Physics Letters, vol. 81, No. 89, Aug. 2002, pp. 1735-1737.

Forrest et al.: "The Dawn of Organic Electronics", IEEE Spectrum, Aug. 2000, Seiten 29-34, XP002189000, IEEE Inc., New York, US ISSN:0018-9235, Seite 33, rechte Spalte, Zelle 58-Seite 34, linke Spalte, Zeile 24; Abbildung 5.

Garbassi F., et al., "Bulk Modifications", Polymer Surfaces, John Wiley & Sons, 1998, pp. 289-300.

Garnier, F. et al, "All-Polymer Field-Effect Transistor Realized by Printing Techniques", Science, American Association for the Advancement of Science, US, vol. 265, Sep. 16, 1994, pp. 1684-1686.

Garnier et al., "Conjugated Polymers and Oligomers as Active Material for Electronic Devices", Synthetic Metals, vol. 28, 1989.

Gelinck, G.H. et al., "High-Performance All-Polymer Integrated Circuits", Applied Physics Letters, v. 77, 2000, pp. 1487-1489.

Goncalves_Conto, Sylvie, et al., "Interface Morphology in Organic Light-Emitting Diodes", Advanced Materials 1999, vol. 11, No. 2, pp. 112-115.

Gosain, D.P., "Excimer laser crystallized poly-Si TFT's on plastic substrates", Second International Symposium on Laser Precision Microfabrication, May 16-18, 2001, Singapore, vol. 4426, pp. 394-400.

Halls, J.J. M., et al., "Efficient photodiodes from interpenetrating polymer networks", Nature, vol. 376, Aug. 10, 1995, pp. 498-500.

Harsanyi G. et al, "Polytronics for biogtronics:unique possibilities of polymers in biosensors and BioMEMS", IEEE Polytronic 2002 Conference, Jun. 23, 2002, pp. 211-215.

Hart, C.M. et al, "Low-cost all-polymer integrated circuits", Solid-State Circuits Conference, 1998. EXXCIRC '98 Proceedings of the 24$^{th}$ European, The Hague, The Netherlands Sep. 22-24, 1998, Piscataway, NJ, USA, IEEE, Sep. 22, 1998, pp. 30-34.

Hebner, T.R. et al., Ink-jet printing of doped polymers for organic light emitting devices:, American Institute of Physics, Applied Physics Letters, vol. 72, No. 5, Feb. 2, 1998, pp. 519-521.

Hergel, H. J.: "Pld-Programmiertechnologien", Elektronik, Franzis Verlag GMBH. Munchen, DE, Bd 41, Nr. 5, Mar. 3, 1992, Seiten 44-46, XP000293121, ISSN: 0013-5658, Abbildungen 1-3.

Hofstraat, Hans, "Will Polymer Electronics Change the Electronics Industry?", Philips Research, Keynote Session, Department Polymers & Organic Chemistry and University of Amsterdam, The Netherlands, 2001.

Hwang J D et al:, "A Vertical Submicron Slc thin film transistor", Solid State Electronics, Elsevier Science Publishers, Barking, GB, Bd. 38, NR. 2,Feb. 1, 1995, Seiten 275-278, XP004014040, ISSN:0038-1101, Abbildung 2.

IBM Technical Disclosure Bulletin, "Short-Channel Field-Effect Transistor", IBM Corp., New York, US, Bd. 32, Nr. 3A, aug. 1, 1989, Seiten 77-78, XP000049357, ISSN:0018-8689, das ganze Dokument.

Kamba, S. et al., "Dielectric dispersion of the relaxor PLZT ceramics in the frequency rangee 20Hz—100 THz", J. Phys.: Condens. Matter 12 (2000), pp. 497-519.

Kawase, T., et al., "Inkjet Printed Via-Hole Interconnections and Resistors for All-Polymer Transistor Circuits", Advanced Materials 2001, 13, No. 21, Nov. 2, 2001, pp. 1601-1605.

Kawase, T. et al., "Inkjet printing of polymer thin film transistors", Thin Solid Films 438-439 (2003) 279-287.

Kind, D., "Einfuhrung in die Hochspannungs-Versuchstechnik", Friedrich. Vieweg & Sohn, Braunschweig/Wiesbaden, pp. 16-21.

Klauk, H. et al., "Pentacene Thin Film Transistors and Inverter Circuits", 1997 International Exectron Devices Meeting Technical Digest, pp. 539-542, Dec. 1997.

Kleim, Herbert et al., "Dielectric Permittivity of $Si_3N$ and $SiO_4$ Increased by Electrode Profile and Material", 1999 Conference on Electrical Insulation and Dielectric Phenomena.

Knobloch, A. et al., "Printed Polymer Transistors", Proc. Polytronic, v. 84, 2001, pp. 84-89.

Kobel W. et al., "Generation of Micropatterns in Poly (3-Methyl-Thiophene) Films Using Microlithography: A First Step in the Design of an All-Organic Thin-Film Transistor" Synthetic Metals, V. 22, 1988, pp. 265-271.

Koezuka, H. et al., "Macromolecular Electronic Device", Mol. Cryst. Liq. Cryst. 1994, vol. 2555, pp. 221-230.

Kumar, Anish et al:, "Kink-Free Polycrystalline Silicon Double-Gate Elevated-Channel Thin-Film Transistors", IEEE Transactions on Electron Devices, vol. 45, No. 12, Dec. 1998.

Kymissis, Ioannis, et al., "High-Performance Bottom Electrode Organic Thin-Film Transistors", IEEE Transactions on Electron Devices, vol, 48, No. 6, Jun. 2001, pp. 1060-1064.

Lidzey, D. G. et al., "Photoprocessed and Micropatterned Conjugated Polymer LEDs", Synthetic Metals, V. 82, 1996, pp. 141-148.

Lowe, J. et al., "Poly (3—(2—Acetoxyethyl)Thiophene): A Model Polymer for Acid-Catalyzed Lithography", Synthetic Metals, Elsevier Sequoia, Lausanne, CH, Bd. 85, 1997, Seiten 1427-1430.

Lu, Wen et al., "Use of Ionic Liquids for Π-Conjugated Polymer Electrochemical Devices", Science, vol. 297, 2002, pp. 983-987/.

Lucent Technologies, "Innovation marks significant milestone in the development of electronic paper", Cambridge, MA and Murray Hill, NJ, Nov. 20, 2000. XP-002209726.

Manuelli, Alessandro et al., "Applicability of Coating Techniques for the Production of Organic Field Effect Transistors", IEEE Polytronic 2002 Conference, 2002, pp. 201-204.

Marko, H., Vorlesungsmanuskript "Nachrichtentechnik 2 (Modulationsverfahren" des Lehrstuhls fur Nachrichtentechnik der Technischen Universitat Munchen, 1989.

Miyamoto, Shoichi et al:, Effect of LDD Structure and Channel Poly-Si Thinning on a Gate-All-Around TFT (GAT) for SRAM's, IEEE Transactions on Electron Devices. vol. 46, No. 8, Aug. 1999.

Nalwa, H.S., "Organic Conductive Molecules and Polymers", vol. 2, 1997, pp. 534-535.

Oelkrug, D. et al., "Electronic spectra of self-organized oligothiophene films with 'standing' and 'lying' molecular units", Elsevier Science S.A., 1996, Thin Solid Films 284-270.

"New Plastic Circuits are Flexible Enough to be Folded in Half", Internet Citation, (On line) Dec. 8, 1997, pp. 1-3, www.research.philips.com/pressmedia/releases/97005E.html.

Prosandeev. S.A., et al., "Characteristics and the nature of the low-frequency dielectric response in moderately concentrated $KTaO3:Ii$", Institute of Physics Publishing, Journal of Physics; Condensed Matter 13 (2001) pp. 9749-9760.

Qiao, X. et al., "The FeCI3-doped poly3-alkithiophenes) in solid state", Elsevier Science, Synthetic Metals 122 (2001) pp. 449-454.

Redecker, M. et al., "Mobility enhancement through homogeneous nematic alignment of a liquid-crystalline polyfluorene", 1999 American Institute of Physics, Applied Physics Letters, vol. 74, No. 10, pp. 1400-1402.

Redinger, David et al., "An all-printed passive component technology for low-cost RFID", Device Research Conterence, Jun. 23, 2003, pp. 187-188.

Rogers J A et al:, "Low-Voltage 0.1 Mum Organic Transistors and Complementary Inverter Circuits Fabricated with a Low-Cost Form of Near-Field Photolithography", Applied Physics Letters, American Institute of Physics. New York, US, Bd. 75, Nr. 7, Aug. 16, 1999, Seiten 1010-1012, XP000934355, ISSN: 003-6951, das ganze Dokument.

Rogers, J. A. et al:, "Printing Process Suitable for Reel-to-Reel Production of High-Performance Organic Transistors and Circuits", Advanced Materials, VCH, Verlagsgesellschaft, Weinheim, DE, Bd. 11, Nr. 9, Jul. 5, 1999, Seiten 741-745, P000851834, ISSN: 0935-9648, das ganze Dokument.

Rogers, J.A. et al:, "Organic Smart Pixels and Complementary Inverter Circuits Formed on Plastic Substrates by Casting and Rubber Stamping", IEEE Electron Devices Letters, vol. 21, No. 3, Mar. 2000, pp. 100-103.

Roman et al., "Polymer Diodes With High Rectification", Applied Physics Letters, vol. 75, No. 21, Nov. 22, 1999.

Rost, Henning et al., "All-Polymer Organic Field Effect Transistors", Proc. Mat. Week, CD, 2001, pp. 1-6.

Sandberg, H. et al, "Ultra-thin Organic Films for Field Effect Transistors", SPIE vol. 4466, 2001, pp. 35-43.

Schoebel, "Frequency Conversion with Organic-On-Inorganic Heterostructured Diodes", Extended Abstracts of the International Conference on Solid State Devices and Materials, Sep. 1, 1997.

Sirringhaus H., et al, "High Resolution Inkjet Printing of All-Polymer Transistor Circuits", Science, vol. 290, Dec. 15, 2000, pp. 2123-2126.

Speakman, S.P. et al., High performance organic semiconducting thin films: Ink Jet printed polythophene [rr-P3HT], Organic Electronics 2 (2), 2001, pp. 65-73.

Subramanian, V.. et al., "Printed Organic Transistors for Ultra-low-cost RFID Applications", Polymers and Adhesives in Microelectronics and Photonics, 2004, Polytronic 2004. 4th IEEE International Conference, Portland, OR, USA, Sep. 12-15, 2004, Piscataway, NJ, pp. 67-71.

Ullman, A. et al., "High Performance Organic Field-Effect Transistors and Integrated Inverters", Mat. Res. Soc. Symp. Proc., v. 665, 2001, pp. 265-270.

Wang, Yading et al., "Electrically Conductive Semiinterpenetrating Polymer Networks of Poly(3-octylthiophene)", Macromolecules 1992, vol. 25, pp. 3284-3290.

Weiss, Ray, "Flash Memory Takes Over", Electronic Design Online ID#3756, Aug. 20, 2001.

Yasufuko, Sachio et al., "Dielectric and Thermoanalytical Behaviour of Moisture and Water In Aromatic Polyamide and Polymide Films", Conference Record of the 1994 IEEE International Symposium on Electrical Insulation, Pittsburgh, PA, USA, Jun. 5-8, 1994.

Yu, G. et al., "Dual-function semiconducting polymer devices: Light-emitting and photodetecting diodes", American Institute of Physics, Applied Physics Letter 64, Mar. 21, 1994, pp. 1540-1542.

Zangara L., "Metall Statt Halbleiter, Programmierung Von Embedded ROMS Ueber Die Metallisierungen", Elektronik, Franzis Verlag GmbH, Munchen, DE, vol. 47, No. 16, Aug. 4, 1998, pp. 52-55.

Zheng, Xiang-Yang et al., "Electrochemical Patterning of the Surface of Insulators with Electrically Conductive Polymers", J. Electrochem. Soc., v. 142, 1995, pp. L226-L227.

Shaheen, S.E., et al., "Low band-gap polymeric photovoltaic devices", Synthetic Metals, vol. 121, 2001, pp. 1583-1584.

Takashima, W. et al., Electroplasticity Memory Devices Using Conducting Polymers and Solid Polymer Electrolytes, Polymer International, Melbourne, 1992, pp. 249-253.

Velu, G. et al. "Low Driving Voltages and Memory Effect in Organic Thin-Film Transistors With a Ferroelectric Gate Insulator", Applied Physics Letters, American Institute of Physics, New York, vol. 79, No. 5, 2001, pp. 659-661.

Wang, Hsing et al., "Conducting Polymer Blends: Polythiophene and Polypyrrole Blends with Polystyrene and Poly(bisphenol A carbonate)", Macromolecules, 1990, vol. 23, pp. 1053-1059.

U.S. Appl. No. 10/344,926, filed Jul. 25, 2003, Bernds.
U.S. Appl. No. 10/380,113, filed Mar. 11, 2003, Bernds, abandoned.
U.S. Appl. No. 10/381,032, filed Aug. 20, 2003, Bernds, abandoned.
U.S. Appl. No. 10/473,050, filed Sep. 26, 2003, Bernds, abandoned.
U.S. Appl. No. 10/479,234, filed Aug. 17, 2004, Bernds, abandoned.
U.S. Appl. No. 10/479,238, filed Jun. 1, 2004, Bernds, abandoned.
U.S. Appl. No. 10/508,737, filed Jan. 10, 2005, Bernds, abandoned.
U.S. Appl. No. 10/523,216, filed Jul. 14, 2005, Bernds.
U.S. Appl. No. 10/523,487, filed Aug. 26, 2005, Clemens, abandoned.
U.S. Appl. No. 10/533,756, filed Jan. 13, 2006, Clemens, abandoned.
U.S. Appl. No. 10/535,449, filed May 19, 2005, Fix, abandoned.
U.S. Appl. No. 10/541,815, filed Jul. 8, 2005, Gerlt.
U.S. Appl. No. 10/541,956, filed Oct. 31, 2005, Clemens, abandoned.
U.S. Appl. No. 10/541,957, filed Feb. 2, 2006, Fix, Abandoned.
U.S. Appl. No. 10/562,989, filed Dec. 28, 2005, Ficker, Abandoned.
U.S. Appl. No. 10/562,869, filed Apr. 7, 2006, Glauret.
U.S. Appl. No. 10/568,730, filed Feb. 17, 2006, Clemens, Abandoned.
U.S. Appl. No. 10/585,775, filed Sep. 28, 2007, Flx, Abandoned.
U.S. Appl. No. 11/574,139, filed Aug. 29, 2007, Ficker.
U.S. Appl. No. 11/721,219, filed Nov. 29, 2007, Clemens.
U.S. Appl. No. 11/721,244, filed Aug. 6, 2007, Blache.
U.S. Appl. No. 11/817,329, filed Oct. 15, 2007, Ullmann.
U.S. Appl. No. 11/994,571, filed Feb. 14, 2008, Ludwig.
U.S. Appl. No. 11/997,235, filed Feb. 28, 2008, Knobloch.
U.S. Appl. No. 11/989,623, filed Mar. 4, 2008, Ullmann, abandoned.
U.S. Appl. No. 12/065,757, filed Mar. 5, 2008, Ullmann.
U.S. Appl. No. 11/991,887, filed Mar. 11, 2008, Ullmann.
U.S. Appl. No. 12/293,852, filed Sep. 22, 2008, Ullmann.
U.S. Appl. No. 12/302,555, filed Dec. 18, 2008, Ficker.
U.S. Appl. No. 12/375,251, filed Feb. 25, 2009, Fix.
U.S. Appl. No. 12/311,620, filed Apr. 22, 2009, Ullmann.
U.S. Appl. No. 12/677,372, filed May 24, 2010, Ludwig.
U.S. Appl. No. 12/678,519, filed Jun. 9, 2010, Ullmann.
U.S. Appl. No. 12/680,754, filed May 24, 2010, Stahl.

* cited by examiner

MULTILAYER BODY WITH ELECTRICALLY CONTROLLABLE OPTICALLY ACTIVE SYSTEMS OF LAYERS

The invention relates to a multilayer body having an optically active layer system.

Optically active layer systems are used, for example, for decorative or informative purposes, or in order to provide security documents with optical security features which on the one hand make it harder to forge them using modern color copiers and other reproduction systems, and on the other hand can easily and clearly be identified by lay persons.

For this purpose, it is known for security threads to be incorporated as security elements in valuable documents, with the arrangement being designed such that the thread is exposed in places on the surface, so that the optical security features which are incorporated in the thread, for example holograms or partial demetalizations, can be checked by the viewer.

Furthermore, EP 1 134 694 A1 discloses an electronic circuit composed of organic semiconductor material being printed on a sheet or a strip of paper, and being connected via a conductor track to a metal strip of a treasury bill. The electronic circuit is in this case not based on electronic components formed from conventional semiconductor materials but on organic field-effect transistors using polymer semiconductor technology. The metal strip is in this case used as an antenna via which it is possible to communicate between the semiconductor circuit and an appropriate evaluation circuit. The electronic circuit can therefore be used to identify forgeries while also allowing the document to be located.

The invention is now based on the object of specifying a multilayer body having a better visual appearance.

The object of the invention is achieved by a multilayer body having an optically active first layer system, with the first layer system being an optically variable device (OVD) and in which case the optical effect of the first layer system can be influenced by an electrically controllable second layer system.

A multilayer body such as this can be designed to be thin and flexible, thus resulting in particular advantages for its use and its production. For example, the multilayer body may be produced at low cost as a film body using a roll-to-roll process, and is therefore suitable for mass production.

The multilayer body according to the invention can be used not only as a novel security element for valuable documents, security documents and for goods protection, but also for decorative purposes or product advertising. Furthermore, the multilayer body can be used in displays, in RFID tags and as a status indication in electrical appliances.

Despite the fact that the multilayer body may be thin, it may be in the form of a large-area film body, for example applied to packages, windows or building surfaces.

Further advantageous refinements are specified in the dependent claims.

The second layer system is advantageously arranged above the first layer system.

In addition, the optical characteristic of the second layer system, in particular its optical density and/or its light scattering and/or its color, may be controllable.

In one advantageous refinement, the second layer system has an upper and a lower electrode layer, between which one or more layers is or are arranged. The layers are preferably layers whose optical characteristics can be varied by application of a voltage between the electrode layers.

The upper electrode layer and/or the lower electrode layer may be composed of polyethylene dioxythiopene (PEDOT)/PSS or PANI.

It is also possible to provide for the upper electrode layer and/or the lower electrode layer to be an ITO (indium tin oxide) layer. Layers such as these are transparent, conductive layers.

The upper electrode may also be composed of a very thin translucent metal layer. The metal layer may have a thickness of 0.5 to 30 nanometers, typically a thickness of 5 nanometers and may be composed of gold, silver, chromium, copper or aluminum.

In a further refinement, the second layer system has a layer which is arranged between the upper and the lower electrode layer and has a multiplicity of liquid-crystal bubbles with a diameter of 0.1 µm to 40 µm, which are bonded in a polymer matrix. By way of example, the polymer matrix may be composed of monomers with a layer thickness of 5 µm to 40 µm, polymerized by way of example by UV radiation. By way of example, this may be the product PN 393 from the Nematel Company. The liquid-crystal bubbles have liquid crystals aligned randomly, in an unorganized form. They therefore scatter incident light so that layers arranged under the layer cannot be perceived or cannot be imaged sharply. The liquid crystals are aligned in an electrical field which is formed between the upper and the lower electrode layer when the electrode layers are connected to the poles of an electrical voltage source.

The voltage source may be either a DC voltage source or an AC voltage source. It is also possible to use electrochemical voltage sources, electrical tuned circuits, which are located in an electromagnetic field and whose signal is processed using an electronic circuit to an appropriate signal frequency, for example 100 Hz, or to use solar cells as the voltage source for the multilayer body according to the invention.

In a further advantageous refinement, the second layer system has a liquid-crystal-layer, which is arranged between the upper electrode layer and the lower electrode layer and at least one polarizer layer. For example, two polarizer layers can be provided, with their polarization planes crossed over at 90°. It is also possible for the liquid-crystal-layer to have cholesteric liquid crystals. The liquid crystals rotate the polarization direction of the light through 90°. This results in the polarized light being able to pass through the lower polarization layer. The second layer system therefore appears transparent, and provides a free view of the first layer system. When an electrical field is formed between the two electrode layers, the second layer system appears dark and blocks the view of the first layer system arranged underneath it.

In addition, it is possible to provide for the second layer system to have an electrolyte layer which is arranged between the upper and the lower electrode layer, and for the upper electrode layer to be an electrochromic layer, for example composed of an electrically conductive organic material such as PEDOT/PSS, or polyaniline (PANI). A redox reaction, which can be controlled by the current direction in the electrolyte layer, makes it possible to change the color of an electrochromic layer composed of PEDOT/PSS from pale blue to dark blue. If the electrochromic layer is composed of PANI, the color can be changed from greeny blue to bluey. The electrolyte layer may also contain metal ions, with the current direction in the electrolyte layer determining whether metal ions are transported from the electrolyte layer into the electrochromic electrode layer, or are moved away from it. If, for example, the metal ions are tungsten ions, the electrochromic electrode layer can be varied from dark blue to colorless.

Other electrochromic systems exist, for example those which react to a change in pH value. These can likewise be used.

If the first layer system has an upper electrically conductive layer, for example a metallic reflective layer, it is possible for the electrically conductive layer to form the lower electrode layer of the second layer system.

In a further advantageous refinement, the second layer system has a thermochromic layer and an electrical resistance layer.

It is also possible for at least one layer of the first layer system to form the electrical resistance layer of the second layer system.

The second layer system may be designed to have areas which reproduce image and/or alphanumeric information. The areas may, for example, be in the form of letters which form an inscription which can be seen by electrical actuation of the second layer system. It may also be a barcode which can be seen only when the multilayer body is placed in an electrical field in a reader. A feature such as this cannot be forged by conventional reproduction processes. For example, in an application such as this, it is possible for the second layer system to have no electrode layers. In consequence, the second layer system can advantageously not be perceived during normal use of the object to which the multilayer body according to the invention has been applied.

It is also possible for the optical effect of the second layer system to be reversibly controllable.

In a further advantageous refinement, the optical change in the second layer system caused by an electrical voltage remains after the electrical voltage is disconnected. For this purpose, the liquid crystals may be ferroelectric liquid crystals. Ferroelectric liquid crystals allow the effect of the electrical field to be stored for a relatively long time, for example over weeks, and they can be reset by an electrical pulse. By way of example, this makes it possible to use a multilayer body with ferroelectric liquid crystals as a data memory for a due date. The due date may be visible once a notice period has elapsed, because the ferroelectric liquid crystals return to their initial position, and the second structure layer is transparent again. It is advantageously possible for a multilayer body such as this not to have any electrodes, so that the electrical field which is required to align the ferroelectric liquid crystals can be formed only in apparatuses intended for this purpose.

In this case the expression an electrically controllable layer system means any layer system in which at least one parameter of its optical effect is changed by application of an electrical voltage. This is a change in the material characteristic which is governed by an electrical variable.

The invention provides for the first layer system to have a replication layer and an optical isolation layer or a reflective layer and for a diffractive relief structure to be formed in the replication layer which, in particular, forms a diffraction grating and/or a hologram or Kinegram® or Trustseal® or comparable system.

Furthermore, the first layer system may be a thin-film layer system in order to produce color-shift effects, which are dependent on the viewing angle, by means of interference.

Layers which produce color changes have a thickness $d=\lambda/4$ or $d=\lambda/2$, where $\lambda$ is the wavelength of the incident light.

It is also possible to form the thin-film layer system from a sequence of high-diffractive-index and low-diffractive-index layers. Layers such as these are also referred to as HRI (high refractive index) layers and LRI (low refractive index) layers, respectively. The greater the number of layers that are chosen, the more sharply the wavelength of the color change effect can be set. In this case, it is particularly advantageous for a thin-film layer system such as this to be formed from two to ten layers (even-number variants) or three to nine layers (odd-number variants).

The first layer system may also be a layer system which has a cholesteric liquid-crystal-layer and an absorption layer. A layer system such as this has a color shift effect which is dependent on the viewing angle, in a similar manner to that of a thin-film layer system.

Systems are also feasible which require only one electrode plane. By way of example, this may be a heating element for a thermochromic layer or a layer system as described above with cholesteric liquid crystals which can be actuated in that plane. The layer arranged under the liquid crystals may have projections at a distance from one another and with a width of about 20 µm and a height of 20 µm to 100 µm, arranged at a distance of less than 100 µm. An OVD as described above may be formed between the projections and optically appears as an entity, because of the small dimensions of the projections. The electrodes which are formed on the projections form areas in the form of strips, which are connected alternately and switchably to the poles of a voltage source. The electrical field formed between the areas therefore runs within the liquid-crystal layer, and not at right angles to the liquid-crystal layer.

It is also possible for the projections to be arranged like a chequerboard and/or for the first and/or the second layer system to be appropriately structured, and for the connecting lines to be in the form of a matrix so that each electrode area can be actuated in rows and columns.

It is also possible to actuate the liquid crystals located between an upper electrode layer and a lower electrode layer (which is structured like a chequerboard) at specific points. It is therefore possible for liquid crystals which are arranged over actuated areas of the lower electrode layer to be aligned in the electrical field, and for liquid crystals which are arranged over unactuated areas of the lower electrode layer to retain the unorganized alignment. The actuated or the unactuated areas may in this way form a pattern, for example representing an image, a logo or one or more alphanumeric characters. The areas which are electrically isolated from one another may be actuated alternately, so that the sub-areas successively change their optical appearance.

In a further refinement, the multilayer body has drive electronics, which are preferably organic drive electronics.

It is also possible for the multilayer body to have one or more sensors and/or RFID circuits and/or displays and/or switches and/or voltage sources.

The two embodiments mentioned above provide a rough outline of the field of application of the multilayer body according to the invention, although this does not restrict further applications.

It is also possible for the multilayer body to be designed to be flexible and/or to have a flexible, transparent carrier film. A flexible multilayer body can advantageously also be applied to curved surfaces. It has particularly good resistance to bending loads, such as those which can occur on thin carrier substrates, for example packages, treasury bills or documents.

In particular, flexible multilayer bodies can be produced at low cost as mass-produced items on installations which are intended for a roll-to-roll process. In this case, additional assemblies, such as RFID tags, solar cells, batteries, storage devices, integrated circuits, film switches and sensors can easily be integrated in the multilayer body.

The invention will be explained in the following text using, by way of example, a number of exemplary embodiments and with the assistance of the attached drawings, in which.

Figure 1A:
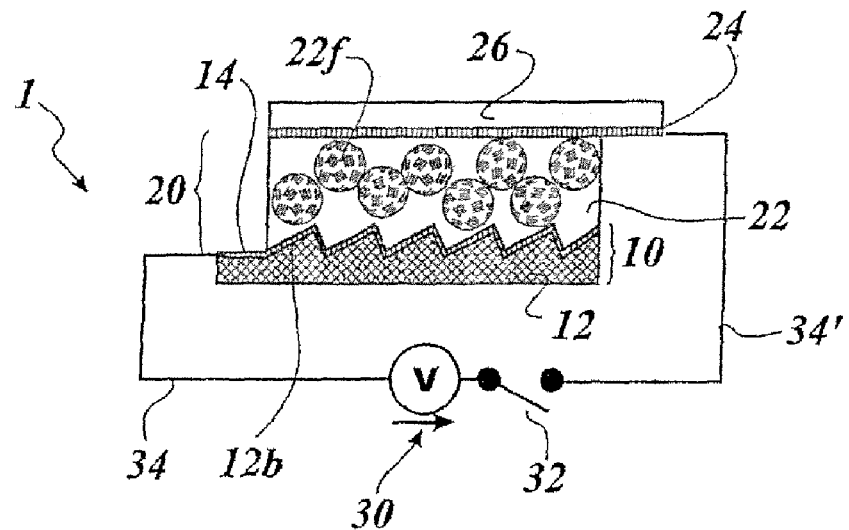
FIGS. 1a and 1b show a first exemplary embodiment of a multilayer body according to the invention in the form of a schematic section illustration.
Figure 1B:
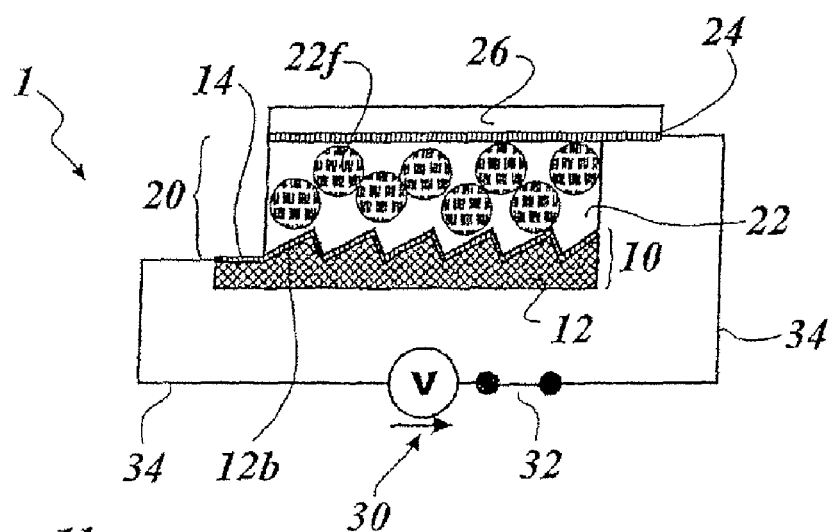

FIGS. 1a and 1b show a schematic section illustration of a multilayer body 1 with an optically variable layer system 10 and a controllable layer system 20.

The layer system 10 is an optically variable device (OVD) with a structure layer 12 in which a diffraction grating 12b is formed. The structure layer 12 may, for example, be formed from a thermoplastic replication varnish with a layer thickness of a few μm, in which the diffraction grating 12b has been impressed with the aid of a heated replication roller. The structure layer 12 is covered with a metallic reflective layer 14 which, for example, is composed of aluminum, silver, chromium, copper or gold.

The controllable layer system 20 has a carrier layer 22 which is arranged on the metallic layer 14. The carrier layer 22 is a polymer matrix in which a multiplicity of liquid-crystal bubbles 22f are embedded. The liquid-crystal bubbles have a diameter of 0.1 μm to 15 μm. The polymer matrix is composed of PN393, which can be applied with a layer thickness from 5 μm to 40 μm. The layer thickness is preferably 10 μm.

A transparent protective layer 26 is arranged on the carrier layer 22 and has an electrode layer 24 on its lower face. In this exemplary embodiment, the layers 26 and 24 are transparent, conductively coated Orgakon™ film from Agfa, with the electrode layer 24 being a transparent conductive polymer. This is PEDOT/PSS, which may have a layer thickness from 50 nanometers to 500 nanometers. The layer thickness is preferably 200 nanometers. The electrode layer 24 may also be a transparent metallic layer.

An electrical field, in which the liquid crystals contained in the liquid-crystal bubbles 22f can be aligned, can be formed by application of an electrical voltage between the electrode layer 24 and the metallic reflective layer 14. In FIGS. 1a and 1b, the liquid crystals are symbolized by short lines. In this exemplary embodiment, the metallic reflective layer 14 is therefore at the same time an electrode layer for the electrically controllable layer system 20. It is therefore a multiple-function layer.

The electrical voltage for controlling the layer system 20 is produced by an electrical voltage source 30 which is electrically conductively connected to the layers 14 and 24 by means of connecting lines 34 and 34' and a switch 32. The connecting lines 34, 34', which are illustrated symbolically in FIGS. 1a and 1b, may be conductor tracks which are formed by continuing the electrically conductive layers 14 and 24.

However, there may also be metallic conductor tracks which make electrical contact with the layers 14 and 24 and, for example, are vapor-deposited.

FIG. 1a shows the multilayer body 1 with the switch 32 open. The liquid crystals arranged in the liquid-crystal bubbles 22f assume an unorganized random position, so that light striking the multilayer body 1 is reflected diffusely, as a result of which the first layer system 10 cannot be seen, or can be seen only insignificantly, and cannot produce an optical effect.

FIG. 1b now shows the multilayer body 1 with the switch 32 closed. An electrical field is now formed between the layers 14 and 24, with its field lines aligned at right angles to the surface of the layers 14 and 24, so that the liquid crystals arranged in the liquid-crystal bubbles 22f now assume an organized position, aligned parallel to the electrical field lines. Because of their small diameter of a few nanometers, light which is incident on the multilayer body 1 can now virtually entirely strike the surface of the structure layer 12 covered with the reflective layer 14, so that the first layer system 10 can develop its optical effect, as an OVD.

The polarity of the electrical voltage source 30 is irrelevant to the principle of operation of the alignment of the liquid crystals with the electrical field lines, on which the exemplary embodiment illustrated in FIGS. 1a and 1b is based. The electrical voltage source 30 may therefore be either a DC voltage source or an AC voltage source. The voltage emitted from the voltage source 30 is essentially of importance to the formation of the electrical field that is suitable for alignment of the liquid crystals. A voltage of approximately 20 V is provided in the exemplary embodiment illustrated in FIGS. 1a and 1b.

In the exemplary embodiment illustrated in FIGS. 1a and 1b, the voltage source 30 can be switched on and off by means of the switch 32. However, it is also possible to dispense with the switch 32 and for the voltage source 30 to be in the form of a tuned circuit in which an external electromagnetic field induces an AC voltage which, if required, is also converted to a DC voltage by means of a rectifier. This DC voltage can be converted back to an AC voltage in the particularly advantageous frequency range around 100 Hz by means of suitable electronics, for example a ring oscillator. A capacitor may also be provided which, when driven with DC voltage, also produces this DC voltage for a certain time after the electromagnetic field has been switched off. If, for example, the multilayer body forms a so-called RFID tag, that is to say a circuit arrangement for radio-frequency-assisted identification of objects, the elements mentioned above may be components of an RFID tag such as this. The RFID tag may advantageously be an organic film circuit.

Figure 2A:
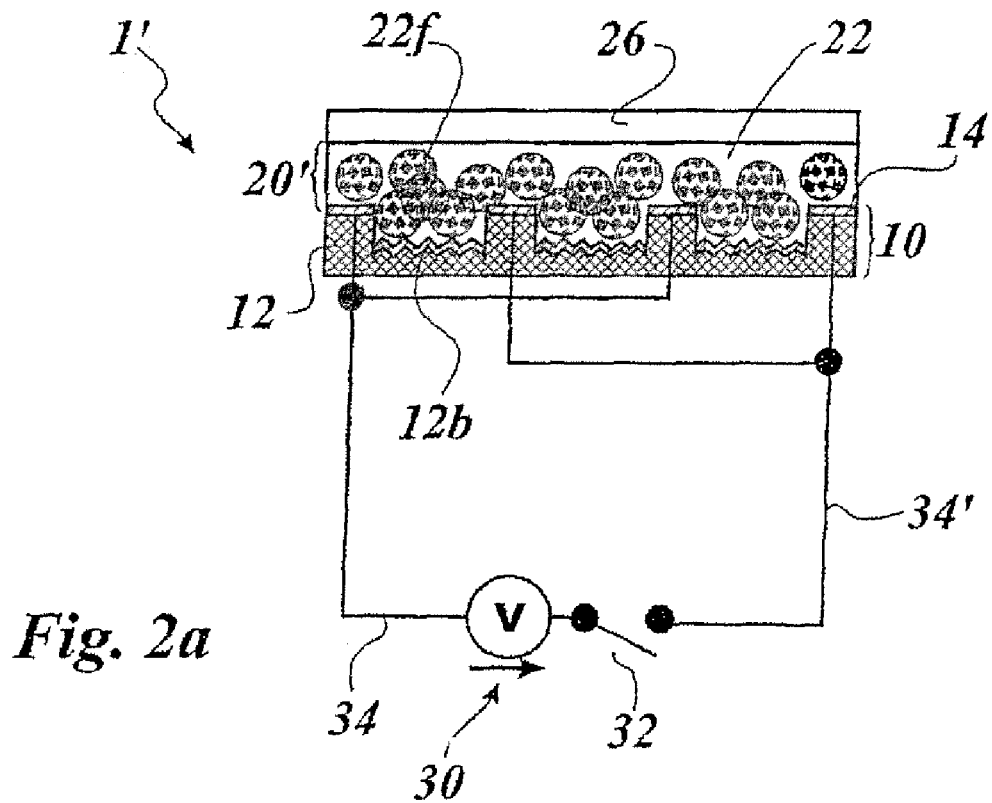
FIGS. 2a and 2b show a second exemplary embodiment of a multilayer body according to the invention in the form of a schematic section illustration.
Figure 2B:
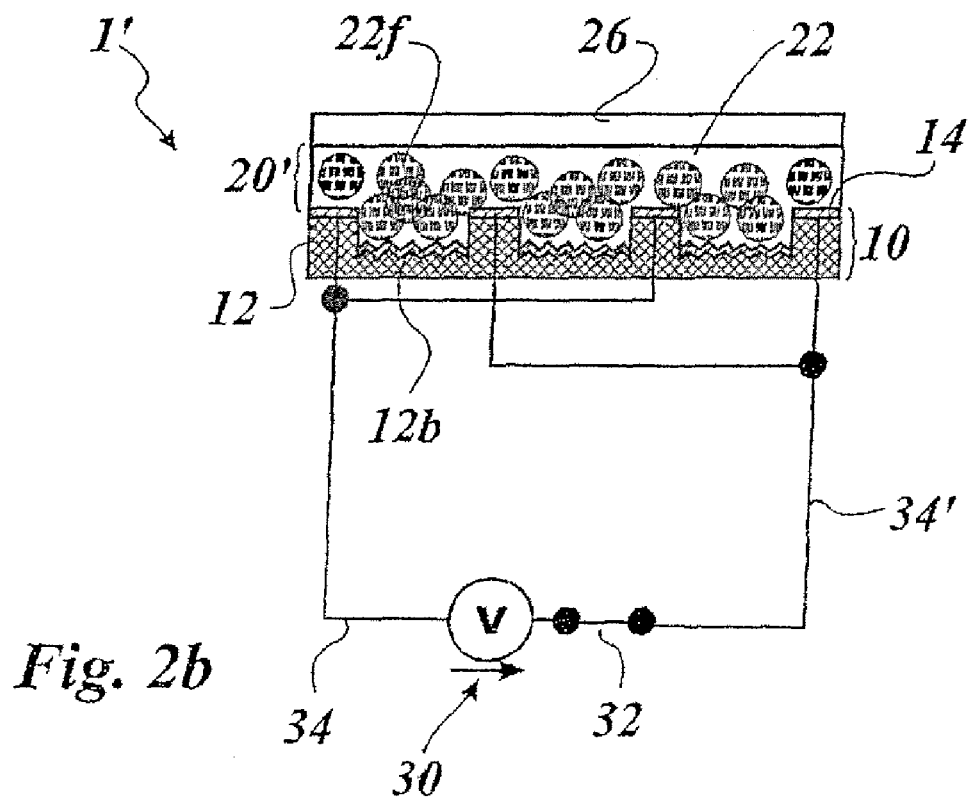

FIGS. 2a and 2b now show a multilayer body 1' which does not have a second electrode layer (see the electrode layer 24 in FIGS. 1a and 1b). In fact, the structure layer 12 now has a relief structure which has projections with a width of about 20 μm and a height of 20 μm to 100 μm, which are arranged at a distance of less than 100 μm. The diffraction gratings 12b are formed in the structure layer between the projections, and are also illustrated in FIGS. 1a and 1b. The metallic reflective layer 14 now forms areas which are arranged on the projections, are in the form of strips and are alternately connected to the connecting lines 34 and 34', so that the areas of the reflective layer 14 which are in the form of strips are alternately connected to the positive pole or negative pole of the voltage source 30 when the switch 32 is closed (see FIG. 2b). The electrical field formed between the areas therefore runs within the carrier layer 22 and not, as in the case of the first exemplary embodiment illustrated in FIGS. 1a and 1b, at right angles to the carrier layer 22. However, the liquid crystals that are located in the liquid-crystal bubbles 22f are aligned analogously to FIG. 1b in the electrical field when the switch 32 is closed, as illustrated in FIG. 2b.

It is also possible to arrange the projections like a chequerboard in the structure layer 12 and for the connecting lines to be in the form of a matrix so that each area of the reflective layer 14 can be actuated in rows and columns. A further exemplary embodiment, which is not illustrated, can additionally provide an electrode layer 24, as illustrated in FIGS. 1a and 1b, so that, with the aid of the reflective layer 14 which is structured like a chequerboard, the liquid crystals which are arranged above actuated areas of the reflective layer 14 are aligned in the electrical field, and the liquid crystals which are arranged above unactuated areas of the reflective layer 14 retain the unorganized alignment. The actuated areas or the unactuated areas may in this way form a pattern, for example representing a logo or one or more alphanumeric characters.

Figure 3A:
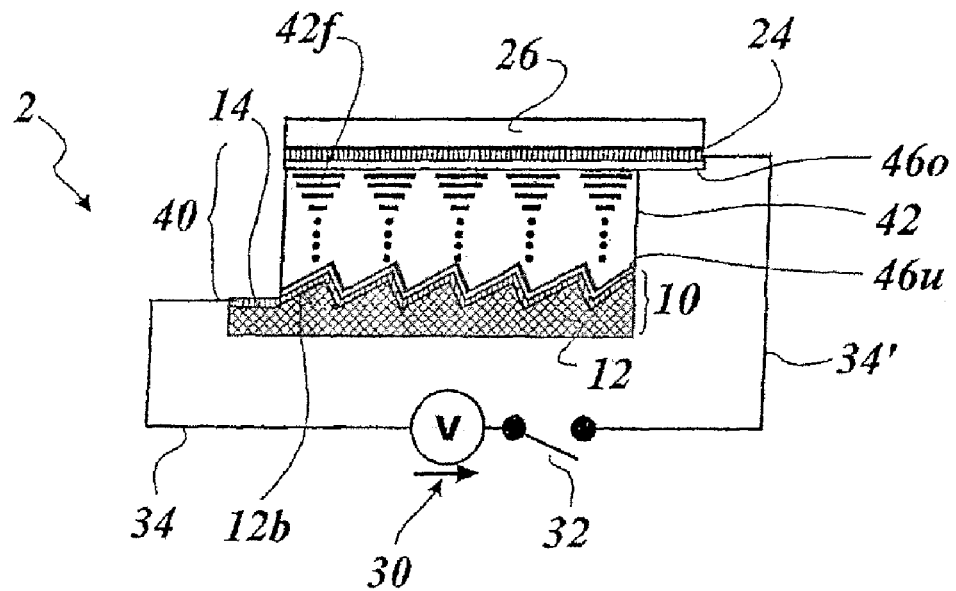
FIGS. 3a and 3b show a third exemplary embodiment of a multilayer body according to the invention in the form of a schematic section illustration.
Figure 3B:
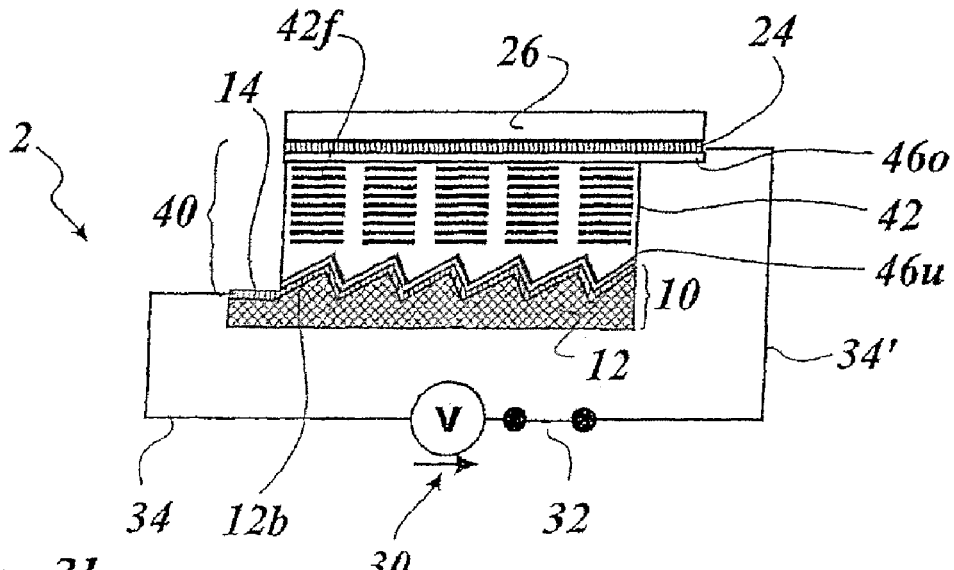

FIGS. 3a and 3b now show a multilayer body 2 which differs from the multilayer body 1 illustrated in FIGS. 1a and 1b only by the formation of the controllable layer system. A controllable layer system 40 has a liquid-crystal-layer 42 in which liquid crystals 42f are embedded and make it possible to rotate the polarization plane of polarized light.

The upper face of the liquid-crystal-layer 42 is covered by an upper polarizer layer 46o, and the lower face of the liquid-crystal-layer is covered by a lower polarizer layer 46u. The polarization directions of the polarizer layers 46o and 46u are crossed over at 90°. Incident light is therefore polarized before it enters the liquid-crystal-layer. The liquid crystals now rotate the polarization plane of the polarized light through 90°. In consequence, the polarized light can pass through the lower polarization layer 46u, and is reflected on the reflective layer 14 of the layer system 10. The reflected light is now once again rotated by the liquid crystals 42f which are arranged in stacks, and emerges from the upper polarizer layer 46o. The layer system 40 therefore appears to be transparent, and provides a free view of the layer system 10, which is in the form of OVD.

The transparent protective layer 26 is arranged on the upper polarization layer 46o, and has the electrode layer 24 on its lower face. As already stated above, the layers 26 and 24 are, for example, composed of a transparent, conductively coated Orgakon™ film. The electrode layer 24 is connected to the voltage source 30 via the connecting line 34' and the switch 32. The other pole of the voltage source 30 is connected to the metallic layer 14 by the connecting line 34. This allows an electrical field to be formed between the layers 14 and 24 by closing the switch 32, thus moving the liquid crystals 42f to a position such that the light which has been polarized by the upper polarization layer 46o can no longer pass through the lower polarization layer 46u. This state of the multilayer body 2 is illustrated in FIG. 2b, in which it is no longer possible to observe the optical effect formed by the layer system 10.

It is also possible to provide for the upper polarization layer 46o and the lower polarization layer 46u to be arranged with the same polarization direction, so that the electrically controllable layer system 20 appears to be opaque when the voltage is switched off, and appears to be transparent when the voltage is switched on.

Furthermore, ferroelectric liquid crystals may be provided for the liquid-crystal-layer 42f. Ferroelectric liquid crystals have the characteristic of storing electrical fields so that the switching state of a liquid-crystal-layer formed by ferroelectric liquid crystals is also maintained for a relatively long time after the voltage has been switched off. This liquid-crystal-layer can be reset by a switching pulse.

Figure 4A:
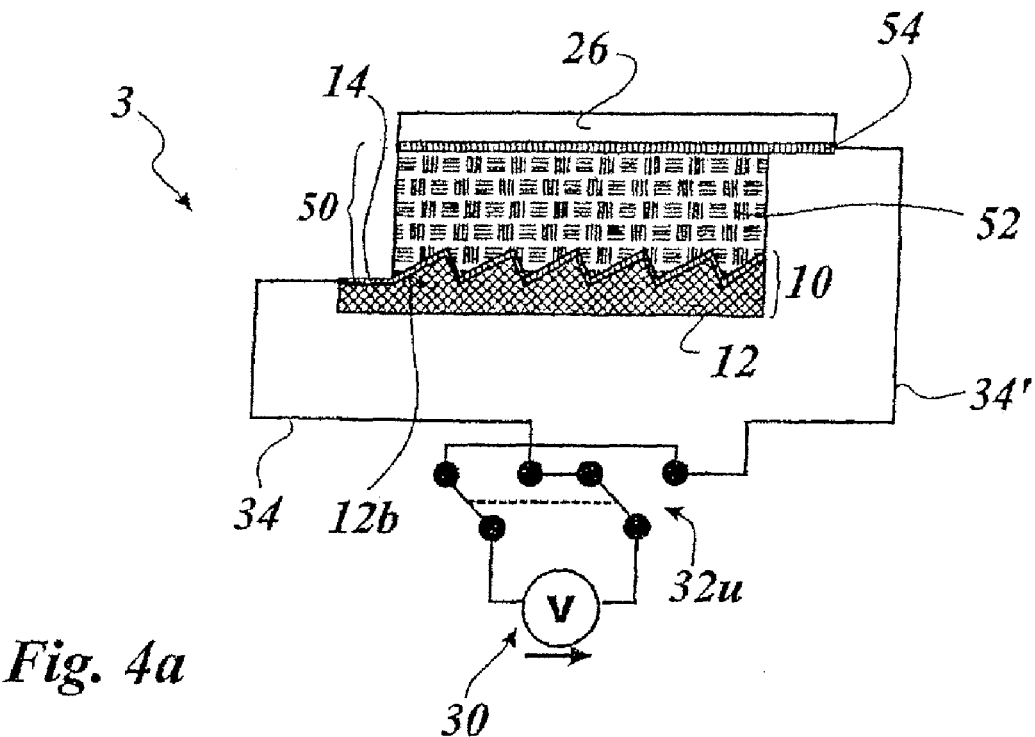
FIGS. 4a and 4b show a fourth exemplary embodiment of a multilayer body according to the invention in the form of a schematic section illustration.
Figure 4B:
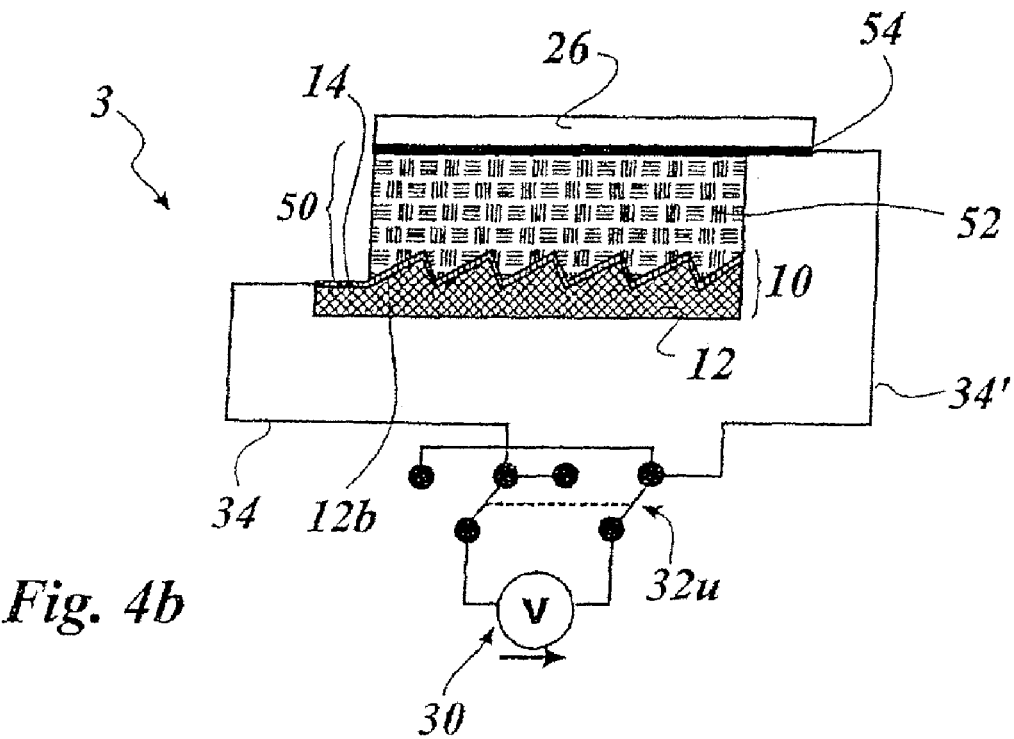

FIGS. 4a and 4b now show a multilayer body 3 in which an electrically controllable layer system 50 is arranged on the optically variable layer system 10, is formed from an electrolyte layer 52 and makes contact with two electrode layers. As in the exemplary embodiments described above, the lower electrode layer is formed by the reflective layer 14 in the layer system 10. An upper electrode layer 54 is formed from an electrochromic material, for example from PEDOT/PSS. The upper electrode layer 54 is covered by the protective layer 26. The two electrode layers 14 and 54 are connected to the voltage source 30 by means of the connecting lines 34 and 34', which are connected to a switch 32u. In the third exemplary embodiment illustrated in FIGS. 3a and 3b, the voltage source 30 is a DC voltage source, whose polarity governs the optical state of the electrochromic electrode layer 54. In this case, an electric current whose current direction is governed by the position of the switch 32u flows through the electrolyte layer 52 and which current, in the illustrated exemplary embodiment, transports metal ions from the electrolyte layer 52 into the electrochromic electrode layer 54, or removes them from it. If, for example, these are tungsten ions, the electrochromic electrode layer 54 may be changed from dark blue to colorless. As described further above, other embodiments are possible which are based on redox reactions, governed by the current direction, or on the change in the pH value of the electrolyte layer.

The switch 32u is a two-pole changeover switch, by means of which the current direction of the electric current flowing through the electrolyte layer 52 can be reversed. This allows the electrochromic electrode layer 54 to be changed from a first, colored, opaque state to a colorless, transparent state.

Figure 5A:
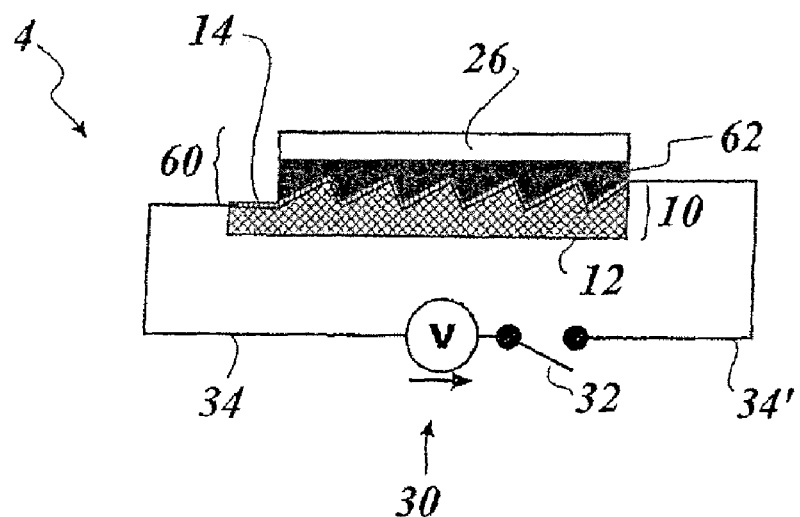
FIGS. 5a and 5b show a fifth exemplary embodiment of a multilayer body according to the invention in the form of a schematic section illustration.
Figure 5B:
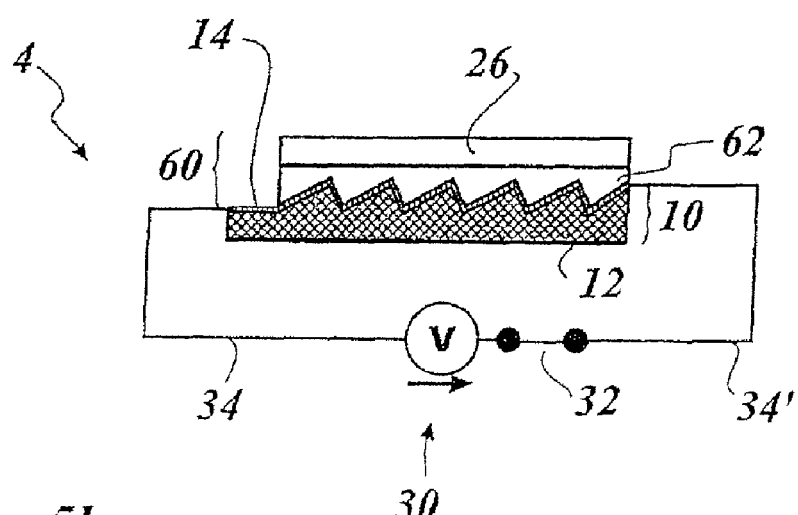

FIGS. 5a and 5b show a multilayer body 4 in which an electrically controllable layer system 60 is arranged on the optically variable layer system 10 and has a thermochromic layer 62. The thermochromic layer 62 in the illustrated exemplary embodiment is composed of TCX B-31 from the Coates Screen Company with a layer thickness of about 20 µm. The layer thickness may be between 0.5 and 100 µm. the thermochromic layer 62 is covered by the protective layer 26.

The metallic reflective layer 14 of the layer system 10 is connected to the voltage source 30 by means of the electrical connecting lines 34, 34' and the switch 32, and at the same time forms an electrical resistance layer for heating the thermochromic layer 62. As in the case of the previous exemplary embodiments, the reflective layer 14 is therefore a layer which can be functionally associated with both layer systems of the multilayer body. However, it is also possible to provide a separate resistance layer, particularly when the reflective layer 14 cannot be adequately electrically loaded. In a situation such as this, the resistance layer is transparent and, for example, is composed of ITO (indium tin oxide) or some other conductive material. By way of example, PEDOT/PSS or PANI may also be used for transparent resistance layers. The resistance layer may also be arranged under the structure layer 12 and, in this case, need not be transparent.

As can be seen in FIG. 5a, the thermochromic layer 62 is not transparent when the switch 32 is open. If the switch 32 is now closed, as illustrated in FIG. 5b, the reflective layer 14 is heated by the start of the current flow and, in consequence, the thermochromic layer 62 arranged on the reflective layer 14 is also heated and in this way becomes transparent. The optical effect formed by the optically variable layer system 10 can now be seen.

FIGS. 6a to 7b now show one exemplary embodiment of the multilayer body according to the invention.

Figure 6A:
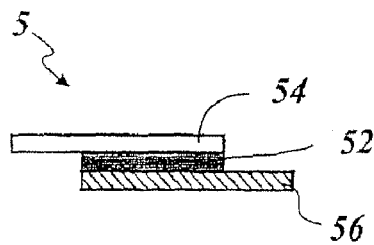
FIGS. 6a to 7b show one application example of a multilayer body according to the invention.

FIG. 6a shows a schematic section illustration of a multilayer body 5 designed in the same way as the multilayer body 1 illustrated in FIGS. 1a and 1b. In this case, some of the layers from FIGS. 1a and 1b are in each case combined.

A layer 52 with liquid-crystal bubbles bonded in a polymer matrix is provided with an upper electrode layer 54 and is arranged on an OVD layer system 56, which is illustrated in FIGS. 1a and 1b and is formed from a replication layer and a metallic reflective layer. The reflective layer facing the OVD layer system at the same time forms the lower electrode layer for the layer 52.

Figure 6B:
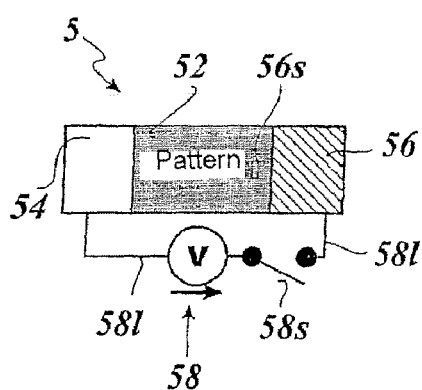

FIG. 6b now shows a schematic plan view of the multilayer body 5, whose electrode layers are connected to a voltage source 58 by means of connecting lines 581 and a switch 58s. The OVD layer system 56 has an inscription 56s, which cannot be seen significantly, or cannot be seen at all, because of the layer 52, which is opaque when no voltage is applied.

Figure 7A:
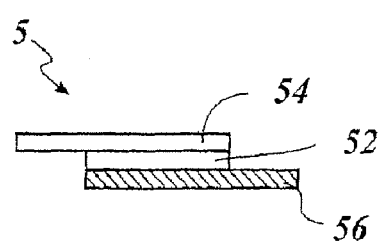
Figure 7B:
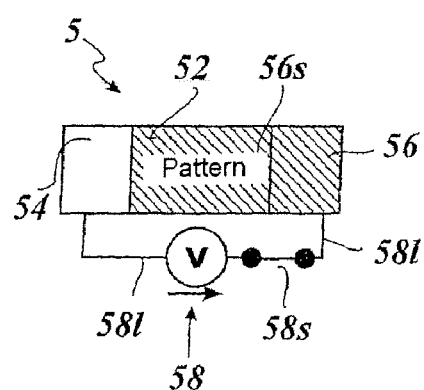

FIGS. 7a and 7b show the multilayer body 5 whose electrode layers are now connected to the voltage source 58, because the switch 58s is closed. The layer 52 is therefore a clear layer, so that the inscription 56s, which is arranged on the OVD layer system 56, can now clearly be read. Furthermore, the optical effect can now be seen and, for example, may be a color change which results when the multilayer body 5 is tilted. It is also possible for the inscription 56s to exhibit an optical effect that is dependent on the viewing angle, for example apparently changing its position.

The multilayer body according to the invention may have further layers, for example an adhesive layer, which is applied to the rear face of the optically variable layer system, or layers which form functional elements such as voltage sources, sensors or electronic circuits. The layers may preferably be formed from polymers, in particular also to form electronic circuits. However, the expression "organic" circuits should expressly also be understood as covering circuits and circuit arrangements which also have inorganic layers as well as organic layers, or only inorganic layers.

The multilayer body according to the invention is also distinguished in that it can be formed to be thin and flexible, thus resulting in particular advantages for its application and its production. For example, the multilayer body may be produced as a film body using a roll-to-roll process at low cost, and is therefore suitable for mass production.

The multilayer body according to the invention may also have an inflexible carrier material, for example composed of glass or ceramic, without departing from the scope of the invention.

Furthermore, the multilayer body according to the invention may also be designed to irreversibly change its optical characteristics. For example, it is possible for the change to be caused by a brief overvoltage, and for the multilayer body to permanently signal that an overload has occurred. An effect such as this may be initiated, for example in the case of electrochromic layers, by an irreversible chemical process in the electrolyte layer.

The invention claimed is:

1. A multilayer body comprising:
   an optically variable device (OVD) active first layer system having at least a diffractive optical effect; and
   an electrically controllable second layer system for influencing the optical effect of the first layer system and arranged above the first layer system, the first layer system including a metallic reflective layer forming a lower electrode layer of the second layer system and exhibiting said at least diffractive optical effect;
   wherein the first layer system comprises a relief structure and a metallic reflective lower electrode layer on the relief structure, which relief structure and lower electrode layer extend generally in a given direction, the relief structure comprising projections extending normal to the given direction and which projections alternate with diffraction gratings forming the diffractive optical effect in the given direction.

2. The multilayer body as claimed in claim 1 wherein the second layer system is arranged so that at least one of the optical characteristics of the second layer system including optical density, light scattering or color is arranged to be controllable electrically.

3. The multilayer body as claimed in claim 1 wherein the second layer system comprises an electrode layer in the form of a partial electrode layer with electrode areas arranged in the form of strips or a matrix.

4. The multilayer body as claimed in claim 1 wherein the first layer system comprises areas which reproduce at least one of an image or alphanumeric information.

5. The multilayer body as claimed in claim 1 wherein the optical effect of the second layer system is arranged to be reversibly controllable.

6. The multilayer body as claimed in claim 1 wherein the optical effect of the second layer system is arranged to be irreversibly controllable.

7. The multilayer body as claimed in claim 1 wherein the optical effect of the second layer system is arranged to be controlled in a bistable form.

8. The multilayer body as claimed in claim 1 wherein the first layer system comprises one of 1) a replication layer and an optical isolation layer or 2) a replication layer and a reflective layer, the replication layer in each case comprising a diffractive relief structure forming at least one of a diffraction grating, a hologram or other diffractive imaging arrangement for providing said diffractive optical effect.

9. The multilayer body as claimed in claim 1 wherein the first layer system is a thin-film layer system for producing color effects by electromagnetic radiation interference.

10. The multilayer body as claimed in claim 1 wherein the first layer system comprises a cholesteric liquid-crystal-layer and an absorption layer.

11. The multilayer body as claimed in claim 1 further including organic and/or inorganic drive electronics coupled to the second layer system.

12. The multilayer body as claimed in claim 1 further including at least one of one or more sensors, an RFID circuit, a display, a switch or a voltage source.

13. The multilayer body as claimed in claim 1 wherein the first and second layer systems are flexible.

14. The multilayer body as claimed in claim 1 wherein the first and second layer systems are flexible and supported on a flexible carrier film.

15. The multilayer body as claimed in claim 1 wherein the lower electrode layer of the second layer system extends in a given direction and is divided into different areas along that given direction, the different areas of the metallic reflective lower electrode layer comprising a planar electrode portion alternating with a diffractive grating electrode portion, the latter forming said optical diffractive optical effect.

16. The multilayer body as claimed in claim 1 wherein the first layer comprises the metallic reflective lower electrode layer extending in a given direction, the lower electrode layer being arranged in the given direction to alternately reflect light and to diffract light in a direction generally normal to the given direction.

17. The multilayer body as claimed in claim 1 wherein the first layer comprises a relief structure and a metallic reflective lower electrode layer on the relief structure, which relief structure and lower electrode layer extends in a given direction, the relief structure comprising projections extending normal to the given direction and which projections alternate with diffraction gratings forming the diffractive optical effect in the given direction, the reflective lower layer on the relief structure for reflecting and diffracting light in a direction generally normal to the given direction.

18. The multilayer body as claimed in claim 15 wherein the planar areas of the metallic reflective lower layer is formed as strips.

19. The multilayer body as claimed in claim 15 wherein the planar areas of the metallic reflective lower layer is formed as strips wherein alternate strips in the given direction are simultaneously connected to a voltage of opposite polarities.

20. A multilayer body comprising:
an optically variable device (OVD) active first layer system having at least a diffractive optical effect; and
an electrically controllable second layer system for influencing the optical effect of the first layer system and arranged above the first layer system, the first layer system including a metallic reflective layer forming a lower electrode layer of the second layer system and exhibiting said at least diffractive optical effect;
wherein the metallic reflective lower electrode layer comprises alternating projections and diffraction gratings extending in a given direction, the gratings forming said diffractive optical effect, the metallic reflective lower electrode layer on the projections being coplanar in a first plane and the diffraction gratings being coplanar in a second plane spaced from the first plane.

21. A multilayer body comprising:
an optically variable device (OVD) active first layer system having at least a diffractive optical effect; and
an electrically controllable second layer system for influencing the optical effect of the first layer system and arranged above the first layer system, the first layer system including a metallic reflective layer forming a lower electrode layer of the second layer system and exhibiting said at least diffractive optical effect;
wherein the lower electrode layer of the second layer system extends in a given direction and is divided into different areas along that direction, the different areas being electrically coupled to a voltage source for creating a field that runs with and extends in the given direction;
wherein the different areas of the metallic reflective lower electrode layer comprise alternating diffractive grating electrode portions, the diffractive grating areas of the metallic reflective lower layer being formed as strips wherein alternate strips in the given direction are simultaneously connected to a voltage of opposite polarities.

* * * * *